United States Patent Office

Re. 27,644
Reissued May 29, 1973

27,644

DECORATIVE LAMINATE BACKCOATED WITH A POLYVINYL ACETATE COMPOSITION

Peter Bernard Kelly and Gene Edward Grosheim, Cincinnati, Ohio, assignors to Formica Corporation, Cincinnati, Ohio No Drawing. Original No. 3,620,899, dated Nov. 16, 1971, Ser. No. 721,589, Apr. 16, 1968. Application for reissue Mar. 1, 1972, Ser. No. 231,037
Int. Cl. B32b *27/10, 27/30, 27/42*
U.S. Cl. 161—162 9 Claims

Matter enclosed in heavy brackets [ ] appears in the original patent but forms no part of this reissue specification; matter printed in italics indicates the additions made by reissue.

ABSTRACT OF THE DISCLOSURE

*A decorative heat and pressure consolidated laminate in which the back most core sheet is coated on its exposed flat surface before the heat and pressure consolidation step with a* [an adherable surface] coating composition consisting essentially of an aqueous latex dispersion of (A) a water dispersible polyvinyl acetate composition having a molecular weight between about 20,000 and 250,000 having a cold flow test value of from about 20 to 2,000, and having a particle size range from about 0.1 to 25 microns, containing from about 0% to about 15%, by weight, based on the weight of the polyvinyl acetate composition solids of a plasticizer, (B) from about 1% to about 10%, by weight, based on the weight of the polyvinyl acetate composition solids, of a protective colloid for (A), and (C) from about 0.1% to about 3%, by weight, based on the total weight of the dispersion of a water soluble starch [and decorative laminates coated on their back sides with said coating composition].

BACKGROUND OF THE INVENTION

Decorative laminates have been produced commercially in the United States and other countries of the world for a substantial plurality of years. These decorative laminates contain a plurality of laminae that are heat and pressure consolidated together to form a unitary structure. The surface sheet is a decorative sheet which may be a solid color or may carry a decorative design thereon such as a wood-grain print, floral designs or geometric figures, and the like. The decorative sheet is impregnated as a preliminary step with a noble thermosetting resin. A noble resin is recognized in the industry as being one which does not undergo any significant color deterioration during the consolidation step. The thermosetting resin is converted to the thermoset state during the consolidation. The decorative sheet containing the noble thermosetting resin is then superimposed over one or more core sheets which are generally kraft paper sheets that have been impregnated with a thermosetting phenolic resin. As before, the thermosetting phenolic resin is converted to the thermoset state during the consolidation step. The number of core sheets can be varied very substantially depending on the thickness of the laminate ultimately desired. When extremely thin laminates are desired, only one core sheet or possibly two core sheets are used. On the other hand, it is frequently desired to make laminates that are 1/32", 1/16" or 1/8" in thickness; or if desired, in even greater thickneses. In order to get the thicker laminates one simply increases the total number of core sheets to three, five, seven, nine or more. If desired and particularly when the decorative sheet is a printed design, one may superimpose over the decorative sheet an overlay sheet which is generally a fine quality alpha-cellulose paper sheet impregnated with a noble thermosetting resin preferably of the same class as that used to impregnate the decorative sheet; and after the heat and pressure consolidation step is completed the overlay sheet becomes transparentized so that the decorative sheet can readily be seen through the overlay sheet. Other protective overlay sheets have also been used such as thermoplastic non-porous films. All of these laminates have in the past been capable of being bonded to a substrate such as plywood, hardboard, cement-asbestos board, particle board, and the like by the use of adhesive systems that are generically described as contact adhesives. When the contact adhesives are used, no sanding of the back is necessary and the bonding of the laminate to a substrate using the contact adhesive as the bonding medium can readily be accomplished. The contact adhesives are significantly more costly than conventional adhesives such as, urea-formaldehyde; white glues (polyvinyl acetate emulsions); hot melts (polyvinyl acetate-elastomers, polyester); phenolic or resorcinol-formaldehyde; epoxy; asphaltic; coal tar; animal glues, and the like. If it is intended to prepare the laminate for use as the surfacing layer of a substrate without using the expensive contact adhesives and instead using the much less expensive conventional adhesives, a sanding of the back most surface of the decorative laminate is required. By the back most surface, it is meant to refer to the exposed flat surface of the laminate which is furthest away from the decorative sheet. The sanding operation, however, is an expensive step in the process and adds to the cost of production. As a consequence, the saving achieved by eliminating the necessity for the use of an expensive contact adhesive is eaten up at least in part by the cost of the sanding operation. The sanding operation furthermore has an additional shortcoming in that exceedingly thin laminates where only one, two, three or four core sheets are used in combination with the decorative sheet, the ultimate laminate being prepared for use with conventional inexpensive adhesives frequently becomes damaged during the sanding operation because of its extreme thinness. This obviously results in rejects which adds to the cost of the total operation; and, therefore, renders such sanding in the long run more expensive on balance than the straight forward use of the expensive contact adhesive on the very thin laminates. The thicker laminates as a rule do not present the problem of significant damage during the sanding operation because of their thickness, but as indicated hereinabove the sanding operation nevertheless adds to the cost of production and overcomes at least in part some of the savings achieved by not having to use the expensive contact adhesives. For a considerable period of time industry has been seeking some method, approach or technique that would enable the preparation of a decorative laminate in all thicknesses which could be used directly, without any sanding operation to bond to a substrate using conventional low-priced adhesives.

(1) Field of the invention

The present invention is in the field of the use of certain polyvinyl acetate compositions, which will be described in much greater detail hereinbelow, as an adherable surface coating composition on the backmost side of a decoative laminate that will permit the direct bonding of the laminate to a substrate without need for either a sanding operation or the expensive contact adhesives, but with the direct use of conventional low-priced bonding agents. The nature of this coating may be likened to a paint primer used to obtain good adhesive between a surface paint and substrate to which adherence is poor. The coating used in our invention, while not used of itself as an adhesive permits the laminate of which it is a part to be adhered to a variety of substrates using conventionally low-priced bonding agents. The coating is not sticky or tacky or in the nature of a pressure sensitive adhesive and in fact laminates with said coating appear the same as similar laminates without the coating as they emerge from the laminating press. The difference lies in the fact that laminates with our coating composition give strong glue bonds when glued with various conventional low cost adhesives to various substrates, while untreated laminates do not, unless they are sanded.

(2) Description of the prior art

Inasmuch as the present invention has solved a plurality of problems that have plagued the laminating industry for a plurality of years, the instant invention is deemed to be a scientific breakthrough and no prior art which is deemed pertinent is known to the instant inventors.

SUMMARY OF THE INVENTION

This invention relates to a decorative heat and pressure consolidated laminate comprising a decorative sheet impregnated with a thermosetting resin which does not undergo any significant color deterioration during the consolidation step having bonded thereto at least one core sheet impregnated with a thermosetting phenolic resin, the back most core sheet having been coated with a composition of matter consisting essentially of an aqueous latex dispersion of (A) a water dispersible polyvinyl acetate composition having a molecular weight between about 20,000 and 250,000 having a cold flow test valve of from about 20 to 2,000 and having a particle size range from about 0.1 to 25 microns, containing from about 0% to about 15%, by weight, based on the weight of the polyvinyl acetate composition solids of a plasticizer, (B) from about 1% to about 10%, by weight, based on the weight of the polyvinyl acetate composition solids, of a protective colloid for (A), and (C) from about 0.1% to about 3%, by weight, based on the total weight of the dispersion of a water soluble starch, before the heat and pressure consolidation, wherein said thermosetting resins have been converted to the thermoset state during the heat and pressure consolidation and wherein the coating on the back most core sheet is on the exposed flat surface thereof which is furthest away from the decorative sheet. The coating composition has been described immediately hereinabove and will be described in greater detail hereinbelow. The thermosetting resins used in the laminae are converted to the thermoset state during the heat and pressure consolidation step.

One of the objects of the present invention is to provide an adherable surface coating composition which when applied to the back most layer of a decoative laminate said laminate can be bonded to a substrate by use of numerous conventional adhesives especially low-pressed types such as ureaformaldehyde and "white glue" instead of the high-priced contact adhesives and without the necessity of any sanding operation. This object and other objects of the present invention will be set forth in greater detail hereinbelow.

The adherable surface coating composition of the present invention consists essentially of an aqueous latex dispersion of three principal components; namely, (A) certain polyvinyl acetate plasticized compositions, (B) certain quantities of a protective colloid for (A); (C) and certain recited quantities of a water soluble starch. The polyvinyl acetate composition should have a molecular weight that is at least 20,000 as determined by standard intrinsic viscosity measurements. A substantial plurality of these polyvinyl acetate compositions are available commercially from a plurality of different sources. Some of these polyvinyl acetate compositions have molecular weights of 100,000, 150,000, 200,000, 250,000 and higher. The instant applicants are not certain of the commercial availablility of some of these higher molecular weight compositions, but they could readily be prepared and would be useful for the intended purpose. In preparing the adhesive composition used in the present invention, it is preferred to use a polyvinyl acetate composition which has a molecular weight between about 8,000 and 150,000. The polyvinyl acetate in the composition can be a homopolymer or a copolymer prepared from vinyl acetate and a different monomer such as maleic anhydride, ethylene, ethyl acrylate or other vinyl type monomers. Partially hydrolyzed polyvinyl acetate compositions can be used which in substance gives the polymeric composition the characteristic of a copolymer of vinyl acetate and vinyl alcohol. Although a significant measure of hydrolysis can be tolerated completely hydrolyzed polyvinyl acetate does not function satisfactorily for the principal end use of the coating composition of the present invention; and as a consequence, are excluded by virtue of the language polyvinyl acetate composition. Many of these polyvinyl acetate compositions, as marketed by various companies, already contain certain small percentages of a plasticizer such as between about 1% and 15%, and preferably between about 3% and 8% by weight, based on the weight of the polyvinyl acetate solids in the composition. Certain other polyvinyl acetate compositions are marketed which do not contain any plasticizer; and they can be used as marketed without any added plasticizer, however for improved results when such plasticizer free compositions are received it is necessary to add a selected amount of plasticizer so as to bring it within the above range; namely, from about 1% to 15% by weight same basis. The plasticizers used in order to achieve the plasticization of polyvinyl acetate compositions are well known and are illustrated by such conventional plasticizers as dibutyl phthalate, benzyl butyl phthalate, certain hydrolyzed resins (coal tar derivatives), dioctyl phthalate, ethyl phthallyl ethylene glycolate, polyesters, chlorinated polyethers, tris-(2,3-dibromopropyl) phosphate, tricresyl phosphate, tris-($\beta$-chloroethyl) phosphate, tetra brominated dibutyl phthalate and the like.

The second essential component used in the adherable surface coating composition to be used in the present invention is a protective colloid which is added in the preparation of the aqueous latex dispersion in amounts varying between about 1% to 10%, and preferably between about 2% and 5% by weight, based on the polyvinyl acetate solids so as to protect the dispersion from settling. These protective colloids are also commercially available and sometimes come in the polyvinyl acetate composition, as it is marketed commercially by a number of sources. Among the materials used as a protected colloid and that are available commercially are carboxymethyl cellulose, hydroxethyl cellulose, polyvinyl alcohol, gum agar, gelatin, gum arabic, and the like. The preferred protective colloid material is polvinyl alcohol, i.e., substantially fully hydrolyzed polyvinyl acetate and may be used in molecular weights ranging from low to medium, medium to high and high molecular weights. The average particle size of the polyvinyl acetate material may also be varied over a fairly wide range such as between about 0.1 and about 25$\mu$ and preferably between about 0.5 and 10 microns. If the particle size is significantly greater than about 25$\mu$, the latex dispersion has a tendency to become unstable and the polyvinyl acetate may settle out. Another characteristic of the polyvinyl acetate composition is its requirement to have a cold flow of between about 20 and 2,000 and preferably between about 500 and 1,200. The cold flow test is simply another measure of molecular weight, but it also gives an indication of strength. The cold flow test is conducted by carrying out the following procedure. The edge of 40 lbs. basis weight kraft paper (3" x 11½") is coated with emulsion to a 1" width using a No. 20 Myer bar. A second piece of kraft is lapped over the edge to give a ½" lap on the wet film. After overnight drying a dumbbell shaped specimen is cut from the test sample. The specimen is suspended in an oven at 159° F. with an 80 g. weight attached. Every two hours an additional 80 g. weight is attached until the adhesive bond breaks. The weight in grams at break is recorded as the cold flow value. Cold flow values below 80 are estimated.

The third essential component in the composition to be used in the present invention is a water soluble starch such as amylose, all of the dextrines, corn starch, and a plurality of commercially available starches which are sold under various trademarks such as Koldex and Aqua-Flakes by nationally known companies; the precise composition of which is not exactly known, but which materials are not deemed to be essentially different from conventional cold water soluble starches. The amount of the starch used may be varied between about 0.10% and 3%, by weight, based on the total weight of the aqueous dispersion. It is preferred to use between about 0.5% and 2.0% by weight, same basis. One of the preferred starches is a commercially available borated starch.

The polyvinyl acetate compositions used in the present invention are unquestionably coatings and interpretively they are adhesives in that they bond as a coating to the phenolic resin impregnated sheet; but a more precise description of said coating would be to identify it as an adhesive receptive coating or an adhesivophile since the coating as applied to the phenolic resin impregnated sheet when dried does not have any significant tack and, in fact, it is the starch in the composition that diminishes or eliminates the tackiness.

The presence of the plasticizer in some of the described varieties of polyvinyl acetate compositions improves the bondability; and the addition of the starch not only serves further to improve the bondability, but also to prevent "blocking" in the treated sheet.

In order to prepare the core sheet for use in the laminate assembly, a sheet of kraft paper of conventional laminating weight is first impregnated with a thermosetting phenolic (phenol-formaledhyde) resin. The kraft sheet is then dried without appreciably advancing the cure of the phenolic resin, and then one side only of said phenolic resin impregnated kraft sheet is coated with the adhesive coating composition described hereinabove. This coating can be applied by any conventional coating application techniques such as the reverse roller coating technique, the air knife technique, the knife coating technique, spraying, and the like. The total solids in the latex composition may be varied over a fairly wide range such as between about 20% and 70%, weight, based on the total weight of the dispersion. Preferably one would use between about 40% and 60% solids by weight, same basis. The amount of the coating composition applied to the surface of the phenolic resin impregnated kraft sheet is such that upon the drying of the coated impregnated sheet there remains on one surface thereof only between about 3 grams and 15 grams of the polyvinyl acetate composition (solids) per square foot and preferably between about 5 grams and 7 grams per square foot, same basis. After the phenolic resin impregnated kraft sheet has been dried and coated with the aqueous latex dispersion the wet coated sheet may then be passed through heating chambers in order to dry the coated impregnated sheet. A conventional 100 foot oven having three heating zones and one cooling zone can readily be utilized for this purpose. The wet coated impregnated sheet may be passed through these drying chambers at a rate of about 75 feet per minute. It is preferred to maintain the first heating zone at about 100° C., the second at about 120° C. and the third at about 140° C. whereupon the coated impregnated sheet is then sufficiently dry so that it can be passed through a cooling zone and either used directly or rolled up and stored for future use. Alternatively one may apply the coating to raw kraft paper and the coated sheet may then be treated on the reverse side with a phenol formaldehyde resin. Still further the coated raw kraft may be used without being pre-impregnated with a phenolic resin for thicker laminates. In these laminates the phenolic resin will flow during the pressing operation from the inner core sheets into the raw kraft back sheet thus preparing in situ the back surface of the laminate whereupon said sheet when used as the bottom-most sheet in the laminate assembly becomes impregnated in its uppermost layers at least with resin migrated from the resin impregnated sheet which had been positioned immediately above said bottom-most sheet.

The term "consisting essentially of" as used in the definition of the composition claimed is intended to exclude the presence of other materials in such amounts as to interfere substantially with the properties and the characteristics possessed by the compositions set forth, but to permit the presence of other materials in such amounts as not to effect substantially such properties and characteristics adversely. For instance, it is known that the presence of surfactants and anti-foam agents especially in any appreciable amount will have an adverse effect on the characteristics of the coating composition particularly with respect to its principal end use.

In order that the concept of the present invention may be completely understood, the following examples are set forth. These examples are set forth primarily for the purpose of illustration and any specific enumeration of detail contained therein should not be interpreted as a limitation in the case except as in indicated in the appended claims.

EXAMPLE 1

A dry decorative sheet impregnated with a commercially available melamine formaldehyde resin is superimposed onto one sheet of kraft paper which had been pre-impregnated with a phenolic resin and coated on one side only with an adhesive coating composition of the present invention using a polyvinyl acetate homopolymer having a molecular weight of about 100,000 and a cold flow of 1,200 and also containing branching to a moderate extent, and having an average particle size of 2$\mu$. The coating composition contained 5% by weight of butyl benzyl phthalate plasticizer and 2% of borated dextrin. The protective colloid was polyvinyl alcohol of moderate to high molecular weight. The non-coated side of the impregnated coated kraft sheet is placed in direct contact with the underside of the melamine resin impregnated decorative sheet. The assembly is placed in a conventional laminating press and using conventional temperatures and pressures the two laminae are heat and pressure consolidated to a unitary structure. Upon removal from the press and cooling, the laminate was coated on its back side with a conventional urea-formaldehyde adhesive and the laminate pressed against a fir plywood substrate. After 16 hours the glue bond strength exceeded the cohesive strength of the commercial plywood.

EXAMPLE 2

Example 1 is repeated in all essential details except that the polyvinyl acetate material used had a molecular weight of 80,000, a cold flow value of about 500, had a low degree of branching and cross-linking, and the polyvinyl acetate had a particle size of about .8$\mu$ and was partially hydrolyzed. The protective colloid was polyvinyl alcohol of a low to medium molecular weight. Upon removal from the press the back was coated with a low-priced white glue and was readily bonded to ⅝" thick particle board to give a good permanent bond. After 16 hours the glue bond strength exceeded the cohesive strength of the particle board.

EXAMPLE 3

Example 1 is again repeated in all essential details except that a thicker laminate was produced by utilizing between the decorative sheet and the base sheet five sheets of kraft paper which had been pre-impregnated with the phenolic resin only and dried. After the heat and pressure consilidation step, the laminate was readily bonded to a white pine substrate using a conventional resorcinol-formaldehyde adhesive to give a very good bond that tenaciously adhered to the substrate. After 16 hours the glue bond strength exceeded the cohesive strength of the white pine substrate.

EXAMPLE 4

Example 3 is repeated in all essential details except that there is interposed between the decorative sheet and the base sheets a foil of treated aluminum. After the heat and pressure consolidation step is completed, the laminate is cooled and is readily bonded to a substrate to give a very good bond but the laminate surface also had a significantly enhanced degree of cigarette burn resistance.

It should be noted that in all of the above examples the laminates as removed from the press and without any sanding operation were capable of being bonded securely to conventional substrates using low-priced adhesives.

EXAMPLE 5

Example 1 is repeated in all essential details except that before the decorative sheet and the base sheet is inserted into the press a non-porous film of a blend of 50 parts of polymethylmethacrylate and polyvinylidene fluoride is superimposed on said decorative sheet and the entire assembly heat and pressure consolidated to a unitary structure to yield a laminate which can be bonded directly without sanding to a substrate using conventional low-prised adhesives to provide a weather resistant surface for outdoor use. The concept of applying such a film to a laminate is disclosed in the U.S. Pat. [application Ser. No. 560,797, filed June 27, 1966 in the name of Charles Hartley Miller, now] [U.S. Pat. No.] 3,458,391, *Charles Hartley Miller,* which [application] *patent* is incorporated herein by reference.

EXAMPLE 6

Example 3 is again repeated except that the back sheet of the laminates was raw kraft paper coated with the adherable coating of this invention. During the consolidation process phenolic resin flows from the adjacent core sheets into the back sheet. The glue bond strength when veneered to the substrate exceeded the cohesive strength of the substrate.

EXAMPLE 7

Example 3 is repeated but without the incorporation of the adherable coating composition of this invention. These laminates were glued to particle board with urea formaldehyde and white glue adhesives. After 16 hours the laminates could be readily pulled away from the particle board with little effort or no wood chips attached to the laminate.

We claim:

1. A decorative heat and pressure consolidated laminate comprising a decorative sheet impregnated with a thermosetting resin which does not undergo any significant color deterioration during the consolidation step having bonded thereto at least one core sheet impregnated with a thermosetting phenolic resin, the back most core sheet having been coated with a composition of matter consisting essentially of an aqeuous latex disperison of (A) a water dispersible polyvinyl acetate composition having a molecular weight between about 20,000 and 250,000 having a cold flow test value of from about 20 to 2,000 and having a particle size range from about 0.1 to 25 microns, containing from about 0% to about 15%, by weight, based on the weight of the polyvinyl acetate composition solids of a plasticizer, (B) from about 1 to about 10 percent, by weight, based on the weight of the polyvinyl acetate composition solids, of a protective colloid for (A), and (C) from about 0.1% to about 3%, by weight, based on the total weight of the dispersion of the water soluble starch, [after the impregnation of said back most core sheet with said phenolic resin] before the heat and pressure consolidation, wherein said thermosetting resins have been converted to the thermoset state during the heat and pressure consolidation and wherein the coating on the back most core sheet is on the exposed flat surface thereof which is furthest away from the decorative sheet.

2. A decorative laminate according to claim 1 wherein the core sheet is coated on its exposed surface with said adherable coating composition in which the molecular weight of said polyvinyl acetate composition is between about 80,000 and 150,000.

3. A decorative laminate according to claim 1 wherein the core sheet is coated on its exposed surface with said adherable coating composition in which the particle size of said polyvinyl acetate composition is within the range of about 0.5 and 10.0 microns.

4. A decorative laminate according to claim 1 wherein the core sheet is coated on its exposed surface with said adherable coating composition in which the cold flow test value of said polyvinyl acetate composition is between about 500 and 1,200.

5. A decorative laminate according to claim 1 wherein the core sheet is coated on its exposed surface with said adhesive coating composition in which the particle size range of said polyvinyl acetate composition is between about 0.5 and 10 microns and the cold flow test value of said polyvinyl acetate composition is between about 500 and 1,200.

6. A decorative laminate according to claim 1 wherein the core sheet is coated on its exposed surface with said adhesive coating composition in which said plasticizer is present in an amount between about 3% and 8%, said protective colloid is present in an amount between about 2% and 5% and said starch is present in an amount between about 0.5 and 2 percent.

*7. A decorative laminate according to claim 1 in which there is used only one core sheet and said core sheet is impregnated, before said coating is applied, with a thermosetting phenolic resin.*

*8. A decorative laminate according to claim 1 in which a plurality of phenolic resin impregnated core sheets are used but the back most core sheet is coated with said coating without being preimpregnated with a phenolic resin.*

*9. A decorative laminate according to claim 1 in which said coating is applied on the exposed flat surface of the back most core sheet of raw kraft paper and then said coated paper is treated on the reverse side thereof with a thermosetting phenolformaldehyde resin.*

References Cited

The following references, cited by the Examiner, are of record in the patented file of this patent or the original patent.

UNITED STATES PATENTS

| | | | |
|---|---|---|---|
| 2,804,418 | 8/1957 | King | 161—248 X |
| 3,067,085 | 12/1962 | Limperos | 161—254 X |
| 3,166,435 | 1/1965 | Meier | 117—119.6 |

OTHER REFERENCES

Schildknecht, C. E., "Vinyl and Related Polymers," John Wiley & Sons, New York City, 1952, p. 435.

"Hack's Chemical Dictionary," Julius Grant, McGraw-Hill Book Co., Fourth edition, 1969, New York City, p. 25.

Skeist, Irving, "Handbook of Adhesives," Reinhold Publishing Corp, New York City, copyright 1962, pp. 354–365.

ALFRED L. LEAVITT, Primary Examiner

C. B. COSBY, Assistant Examiner

U.S. Cl. X.R.

156—308, 328, 335; 161—248, 251, 258, 264; 260—17.4 ST, 29.6 B

UNITED STATES PATENT OFFICE
CERTIFICATE OF CORRECTION

Patent No. RE 27,644 Dated May 29, 1973

Inventor(s) Peter Bernard Kelly and Gene Edward Grosheim

It is certified that error appears in the above-identified patent and that said Letters Patent are hereby corrected as shown below:

Column 1, line 65, "thickneses" should read -- thicknesses --.

Column 2, line 61, "decoative" should read -- decorative --; line 66, "adhesive" should read -- adhesion --.

Column 3, line 52, "low-pressed" should read -- low-priced --;

Column 4, line 2, 8,000 should read -- 80,000 --;
Column 5, line 43, insert the word -- by -- before the word weight.

Column 6, line 22, delete the word "in" before the word indicated and substitute the word -- is --; line 70, "consilidation" should read -- consolidation --.

Column 7, Example 5, lines 22 and 23, "low-prised" should read -- low-priced --; Example 7, line 65, "the" third occurrence should read -- a --.

Signed and sealed this 2nd day of April 1974.

(SEAL)
Attest:

EDWARD M.FLETCHER,JR.
Attesting Officer

C. MARSHALL DANN
Commissioner of Patents

USCOMM-DC 60376-P69
U.S. GOVERNMENT PRINTING OFFICE : 1969 O—366-334